United States Patent [19]
Bock et al.

[11] Patent Number: 5,128,535
[45] Date of Patent: Jul. 7, 1992

[54] METHOD FOR MEASUREMENT OF PRESSURE APPLIED TO A SENSING ELEMENT COMPRISING A CHOLESTERIC LIQUID CRYSTAL

[75] Inventors: Wojtek J. Bock, Crescent, Canada; Tomasz R. Wolinski, Warsaw, Poland

[73] Assignee: Universite Du Quebec A Hull, Hull, Canada

[21] Appl. No.: 733,757

[22] Filed: Jul. 24, 1991

[51] Int. Cl.$^5$ .............................................. G01L 1/24
[52] U.S. Cl. ........................... 250/227.21; 250/231.19; 359/70
[58] Field of Search ............... 250/227.21, 231.19; 73/705; 359/46, 70

[56] References Cited

U.S. PATENT DOCUMENTS

| | | | |
|---|---|---|---|
| 4,883,336 | 11/1989 | Bock et al. | 350/96.20 |
| 4,897,542 | 1/1990 | Dakin et al. | 250/227 |
| 4,920,261 | 4/1990 | Bock et al. | 250/225 |
| 4,933,545 | 6/1990 | Saaski et al. | 250/231.19 |

OTHER PUBLICATIONS

W. J. Bock, A. W. Domanski, M. Beaulieu, "Fiber-Optic High Hydrostatic Pressure Sensor Based on Changes in Transmission Through a Semiconductor Plate", Proc. SPIE, 1969, 280 (1989).
A. W. Domanski, T. R. Wolinski, W. Borys, "Fiber-Optic Liquid Crystalline High-Sensitivity Temperature Sensor", Proc. SPIE, 1169 (1989).
P. Pollmann; "Eine Apparatur zur Messung der Lichtreflektion Cholesterischer Mesophasen bei hohen Drunken"; Journal of Physics E: Scientific Instruments, 1974, vol. 7; pp. 490–492.
"Die Druckabhaengigkeit der linearen Doppelbrechung eines cholesterischen Flüssigkristalls. Optische Rotation und Selektivreflexion einer Mischung von Cholesterylnonanoat und Cholesterychlorid von 60°-130° C. und bis 3 kbar" by P. Pollman und P. Wiege, Ber. Bunsenges, Phys. Chem., 88, 612–616 (1984)—Verlag Chemie GmbH, D-6940 Weinheim, 1984, pp. 612–616.

*Primary Examiner*—Janice A. Howell
*Assistant Examiner*—James Beyer
*Attorney, Agent, or Firm*—Foley & Lardner

[57] ABSTRACT

The method is for measurement of pressure applied to a sensing element comprising a cholesteric liquid crystal being connected to multimode optical fibers for communication with a light source and a device for measurement of light intensity. The method resides in guiding a light beam of predetermined wavelength generated by the light source toward a layer of the cholesteric liquid crystal using one of the multimode optical fibers. The light beam reflected by the layer is collected using another of the multimode optical fibers being connected to the device for measurement of light intensity. This device measures then the intensity of the reflected light beam, such that a value indicative of the pressure as a function of the measured intensity can be carried out. This method is particularly well adapted for measuring pressure up to 100 MPa with a good linear response and sensitivity for specific ranges of pressure useful in industrial applications.

7 Claims, 9 Drawing Sheets

METHOD FOR MEASUREMENT OF PRESSURE APPLIED TO A SENSING ELEMENT COMPRISING A CHOLESTERIC LIQUID CRYSTAL

FIELD OF THE INVENTION

The present invention relates to a method for measurement of pressure applied to a sensing element comprising a cholesteric liquid crystal, the sensing element being connected to multimode optical fibers for communication with a light source and a device for measurement of light intensity.

More precisely, the invention relates to a method for measurement of pressure which exploits the effect of pressure-induced changes in the wavelength of maximum light reflexion observed in cholesteric liquid crystals.

BACKGROUND OF THE INVENTION:

Over the past, there has been extensive research and development activity in the design and production of optical fiber sensors for the measurement of physical and chemical variables. However, only a few documents have dealt with optical fiber sensing of high pressure, i.e. pressure of at least 60–70 MPa. One sensor able to measure such high pressure has been reported in the U.S. Pat. No. 4,920,261 granted on Apr. 24, 1990, to BOCK et al, where it is described a sensor which uses the direct effect of hydrostatic stress on the polarization mode coupling which occurs in highly birefringent polarization-maintaining single-mode optical fibers. This intrinsic polarimetric sensor can be regarded as a one-fiber Mach-Zehnder interferometer, carrying two modes differing in polarization and whose phase delays exhibit different responses to the external pressure. Its pressure coefficient is nearly two orders of magnitude higher than can be obtained with current high-pressure sensors. It also offers flexibility in that it can be applied to any required range of pressures up to 200 MPa. Another type of hydrostatic pressure measurement has been proposed in the publication entitled "FIBER-OPTIC HIGH HYDROSTATIC PRESSURE SENSOR BASED ON CHANGES IN TRANSMISSION THROUGH A SEMICONDUCTOR PLATE" by W. J. BOCK et al, Proc. SPIE, 1169, 280 (1989). This type of hydrostatic pressure is based on displacement of the absorption edge in a semiconductor under the effect of high pressure. It is well suited for a pressure range up to 100 MPa and is composed of a single GaAs crystal attached to multimode optical fibers.

The major drawbacks and limitations of these kinds of optical fiber pressure sensors are such as source and detector aging, attenuation changes in optical fibers and connectors, contamination of optical components, disturbing effects of temperature and mechanical vibrations, and substantial costs involved.

Also over the past, cholesteric liquid crystals (referred to hereinafter as ChLCs) have been intensively investigated from both theoritical and practical points of view. They have been successfully applied as single detectors of temperature as described in the publication entitled "FIBER-OPTIC LIQUID CRYSTALLINE HIGH-SENSITIVITY TEMPERATURE SENSOR" by A. W. DOMANSKI et al, Proc. SPIE, 1169, (1989). They have also been successfully applied as single detectors of radiation and organic-compound vapors, as monitors of temperature fields in ionization radiation, and as infrared-visible transducers. The newest generation of liquid crystal displays utilizes two electro-optical effects: dynamic scattering with the storage mode and the cholesteric/nematic phase transition. Other applications of ChLCs include various types of light beam modulators.

High pressure effect studies on liquid crystals have given new insight into the nature of molecular interactions responsible for liquid crystalline ordering and from the practical point of view they have great potential for application in high pressure metrology. To date, few high pressure experiments with liquid crystals have been reported, since measurement under high pressure requires a specialized apparatus for communicating with the high pressure region containing the liquid crystal sample. Furthermore, past ChLCs were object to degradation and aging.

An object of the present invention is to provide a method for measurement of pressure which minimizes or even overcomes the disadvantages and limitations of the methods used in prior art.

Another object of the present invention is to provide a method for measurement of pressure up to at least 100 MPa.

Still another object of the present invention is to provide a method for measurement of pressure which is directly applicable and compatible with optical fiber telemetry and optical data transmission systems, and which can be applied at lower costs than the prior art methods.

SUMMARY OF THE INVENTION

According to the present invention, there is provided a method for measurement of pressure applied to a sensing element comprising a cholesteric liquid crystal, said sensing element being connected to multimode optical fibers for communication with a light source and a device for measurement of light intensity, said method comprising the steps of:
guiding a light beam of predetermined wavelength generated by said light source toward a layer of said cholesteric liquid crystal using one of said multimode optical fibers;
collecting the light beam reflected by said layer using another of said multimode optical fibers connected to said device for measurement of light intensity;
measuring the intensity of the reflected light beam; and
determining a value indicative of said pressure as a function of the measured intensity.

The present invention as well as its numerous advantages will be better understood by the following non-restrictive description of possible embodiments made in reference to the appended drawings.

DESCRIPTION OF THE DRAWINGS

Figure 1:
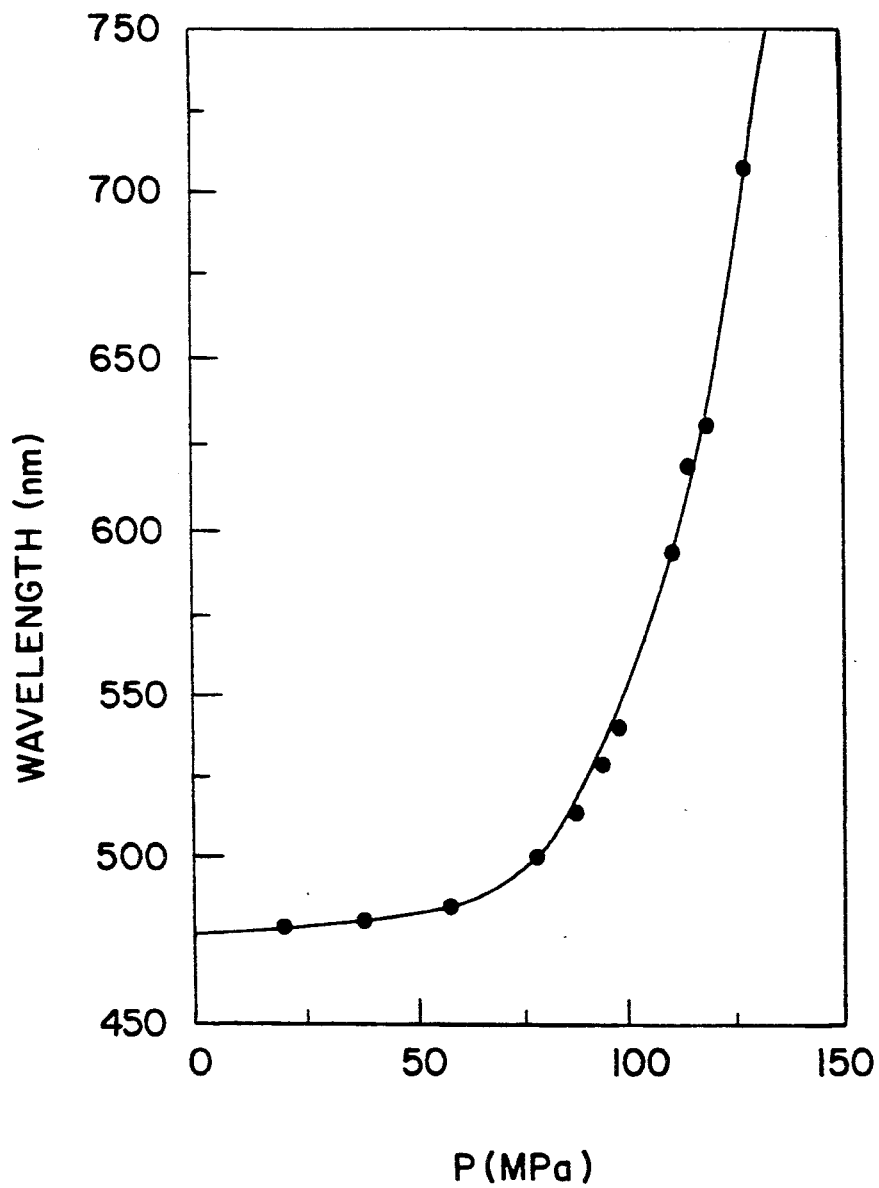
FIG. 1 is a diagram illustrating particular pressure dependence of the maximum reflection wavelength of a specific ChLC mixture.

In the following description and in the drawings, the same numerals refer to same elements.

The influence of high hydrostatic pressure on the thermo-optical properties of ChLCS has been described in a publication entitled "EINE APPARATUR ZUR MESSUNG DER LICHTREFLEKTION CHOLESTERISCHER MESOPHASEN BEI HOHEN DRUCKEN" by P. POLLMANN, J. Phys. E Sci. Instrum, 7, 490 (1974), in which the wavelength of maximum reflection of light $\lambda_R$ of cholesteric mesophases has been determined for high pressure up to 500 MPa. The results illustrated in FIG. 1 show that in a definite pressure range (above 50 MPa) the sensitivity of $\lambda_R$ to pressure is extremely large, with a red shift of $\lambda_R$. The red shift under pressure can be explained in terms of pretransition effects occurring in the vicinity of the smectic A/cholesteric phase transition, for example by an increase in the transition temperature due to decreasing of intermolecular distances. Pressure dependence of the linear birefringence of a ChLC has been described in the publication entitled "DIE DRUCKABHANGIGKEIT DER LINEAREN DOPPELBRECHUNG EINES CHOLESTERICHEN FLUSSIGKRISTALLS..." by P. POLLMANN et al., Ber. Bunsenges. Phys. Chem., 88, 612 (1984), which made it possible to calculate the pressure dependence of the order parameter representing the degree of parallel orientation of the molecules. It appeared that at the transition point to the isotropic phase, the order parameter was independent of the transition pressure.

Since ChLCs are formed by optically active molecules added, in general, to a nematic host phase, the nematic uniaxial structure undergoes a helical distortion: the direction of the long molecular axes in each successive layer (made up of molecules which are oriented in parallel and moving freely in two directions) forms a given angle with the direction of the axes of molecules in the preceding layer. In this way, a helix is formed, whose pitch ($Z_0$) is dependent on intermolecular and external fields and forces.

Optical properties of ChLCs are very specific and are determined by the pitch $Z_0$, the arrangement of the axis of the helix and the polarization of the incident light. When an external field (electric, magnetic, optical) or a mechanical deformation is applied, changes occur in both the direction of the axis of the helix (texture transition) and its pitch (untwisting of the helix). For a long time, it has been well known that temperature can strongly affect the optical properties of a ChLC and this property has been used to construct discrete ChLC temperature sensors, as well as discrete sensors with optical fibers. It has been also used for measurement of superficial temperature and for visualization of various thermal fields. The idea behind all of these display devices is based on the selective reflection phenomenon which occurs in a special configuration of a ChLC. In most ChLCs, $Z_0$ is a decreasing function of temperature, that is $dZ(T)/dT < 0$ and the order of magnitude of $dZ/dT$ is often surprisingly large. However, other kinds of thermal behaviour such as $dZ/dT \approx 0$ and $dZ/dT > 0$ are also possible, especially in induced chiral nematic liquid crystals and some explanations have been proposed. When a light beam is incident normally on a ChLC sample arranged in a planar Grandjean texture, it can be reflected selectively from it only if the following condition is met:

$$<n> \cdot Z_0 = \lambda \qquad (1)$$

where $<n>$ is the mean refractive coefficient of the ChLC and $\lambda$ is the wavelength used. This is valid in the case of a Bragg reflection from planar ChLC layers and it also explains why any change of helical pitch under the influence of any external parameter (temperature, pressure, electromagnetic fields, etc.) causes a change in the wavelength (color) reflected selectively from the cholesteric layer. The spectral band of the Bragg reflection is proportional to the optical anisotropy of the ChLC and can vary from about 20 nm to about 80 nm.

Thermal dependance of the helix is the basis of all the ChLC sensing devices and monitors for detection of various physical (thermal) fields and chemical phenomena in which temperature plays a significant role.

The other thermodynamic parameter which reveals some interesting effects in liquid crystals is pressure. Measurement under high pressure can generate additional experimental data on basic thermodynamic quantities, specially at and in the vicinity of phase transitions between different liquid crystal phases. Pressure plays also an important role in monitoring the character of the phase transitions. Some transitions between different liquid crystal phases are usually discontinuous, but it should possible to make them continuous by increasing either the transition pressure or the transition temperature or both, since coexisting liquid crystal phases are thermodynamically very similar. Moreover, there are known compounds which at atmospheric pressure do not form liquid crystals but as the pressure is raised they exhibit mesophase.

For typical cholesteric mixtures, application of hydrostatic pressure causes a red shift of the wavelength of maximum light reflection, hence—according to equation (1)—helical pitch increases, and in the vicinity of the smectic A/cholesteric phase transition, a divergence of the cholesteric helical pitch may even be observed. This behavior of the pitch has been theoretically predicted and explained in terms of pretransition effects arising from the increase of interactions between molecules due to the decrease of intermolecular distances.

Figure 2:
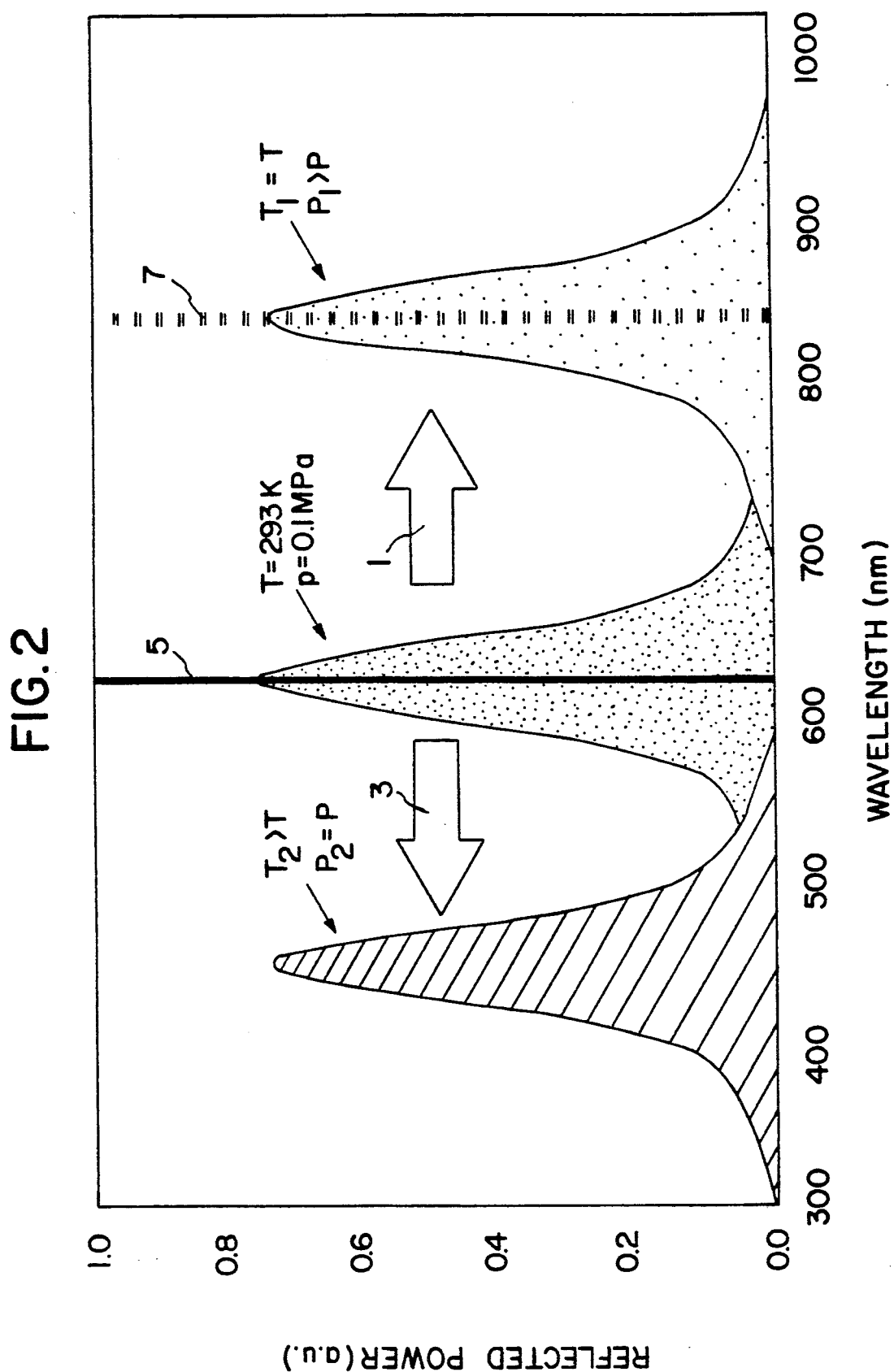
FIG. 2 is a diagram illustrating a typical selective light reflection spectrum of a ChLC sample with a schematic representation of shifts caused by the influence of pressure and temperature.

FIG. 2 shows a typical quasi-absorption spectrum caused by selective light reflection from cholesteric mixtures, together with a schematic representation of the influence of pressure (arrow (1)) and temperature (arrow (3)) on its position, where a 50 nm spectral band of the selective Bragg reflection is assumed. The positions of the light source used in the framework of the invention (a He-Ne laser at a 633 nm (5) wavelength and a laser diode emitting at 845 nm (7), both with half-power bandwidths less than 1 nm) are also shown.

Figure 3:
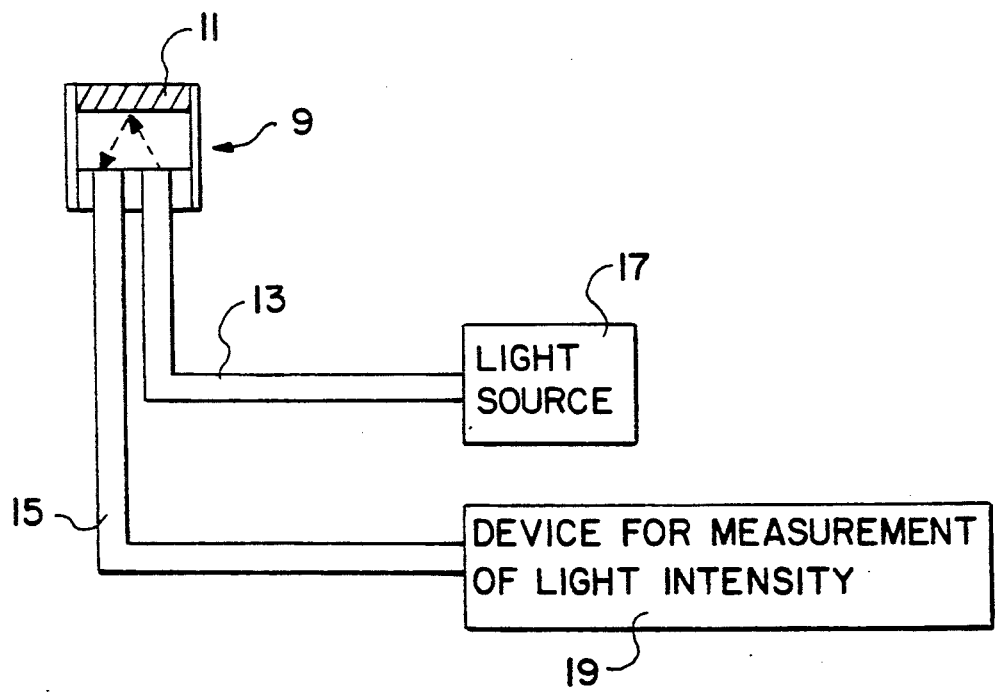
FIG. 3 shows a principle schematic diagram of the method according to the invention.

Referring now to FIG. 3, the method for measurement of pressure according to the invention is implemented with a sensing element (9) comprising a cholesteric liquid crystal (11) on which the pressure making the object of measurement is applied. The sensing element (9) is connected to multimode optical fibers (13 and 15) for communication with a light source (17) and a device for measurement of light intensity (19). The method is practiced by guiding a light beam of predetermined wavelength generated by the light source (17) toward a layer of the cholesteric liquid crystal (11) using one of the multimode optical fibers (13). The light beam reflected by the layer of cholesteric liquid crystal (11) is collected using another of the multimode optical fibers (15) which is connected to the device for measurement of light intensity (19). This device (19) measures the intensity of the reflected light beam such that a determination of a value indicative of the pressure can be carried out as a function of the measured intensity by an apparatus such as a computer. Collection of the light beam may be improved by using two multimode optical fibers instead of only one, each disposed on both sides of the multimode optical fiber guiding the light beam toward the ChLC layer.

Variations of the above-mentioned method (referred to hereinafter as the main method) have been developed to enhence the accuracy of the pressure measurement, for example as by minimizing temperature effects, by using different types of references to carry out the pressure measurement.

An investigated way to provide a reference is by applying the steps of the main method to two light beams guided toward the same ChLC layer. The respective wavelengths of the two light beams have to be selected such that the intensity of only one light beam will be altered in relation with the pressure when reflected, the other beam acting as a reference. Wavelengths which lend themselves well to this are 632.8 nm for the light beam relating to the pressure measurement and 845 nm for the light beam acting as reference. The red light emission at 632.8 nm can be easily generated by a He-Ne laser while the infrared light emission at 845 nm can be easily generated by a laser diode. Two multimode optical fibers connected to the sensing element are so used for guiding the light beams toward the ChLC layer. At least one other multimode optical fiber connected to the device for measurement of light intensity is also used for collecting the light beams reflected from the ChLC layer. The value of the pressure may be then determined by a ratio of the intensity of the collected light beams received by the device for measurement of light intensity.

Another investigated way to provide a reference is by applying the steps of the main method on two sensing elements comprising ChLCs having, at a given temperature, different wavelengths of selective reflexion such that pressure can be measured for different ranges of temperature, as low and high temperatures for example. In such a case, at lower temperatures, only one sensing element is activated while the second acts as a reference. At higher temperatures, the roles of the sensing elements are interchanged (the first is a reference while the second acts as a pressure sensor).

Since the beams to be guided toward the two sensing elements by at least two multimode optical fibers should have the same wavelength, a beam splitter may be provided for splitting the light beam generated by the light source into two light beams respectively sent to the multimode optical fibers. By using a light beam having a 632.8 nm (red) wavelength, the value of the pressure may be then determined by a ratio of the intensity of the collected red wavelength light beams received by the device for measurement of light intensity.

Still another investigated way to provide a reference is by applying the steps of the main method on two identical ChLC sensing elements influenced by the same temperature (ambient for example) but different pressure conditions. For instance, when the pressure making the object of measurement is bounded in a determined region, one of the sensing elements may be placed in that region while the other is placed outside the region where pressure is substantially constant such as ambient pressure, as long as thermal conditions inside and outside the region are substantially the same. In that case, the determined value may be a ratio indicative of both pressure and temperature characteristics.

Figure 4A:
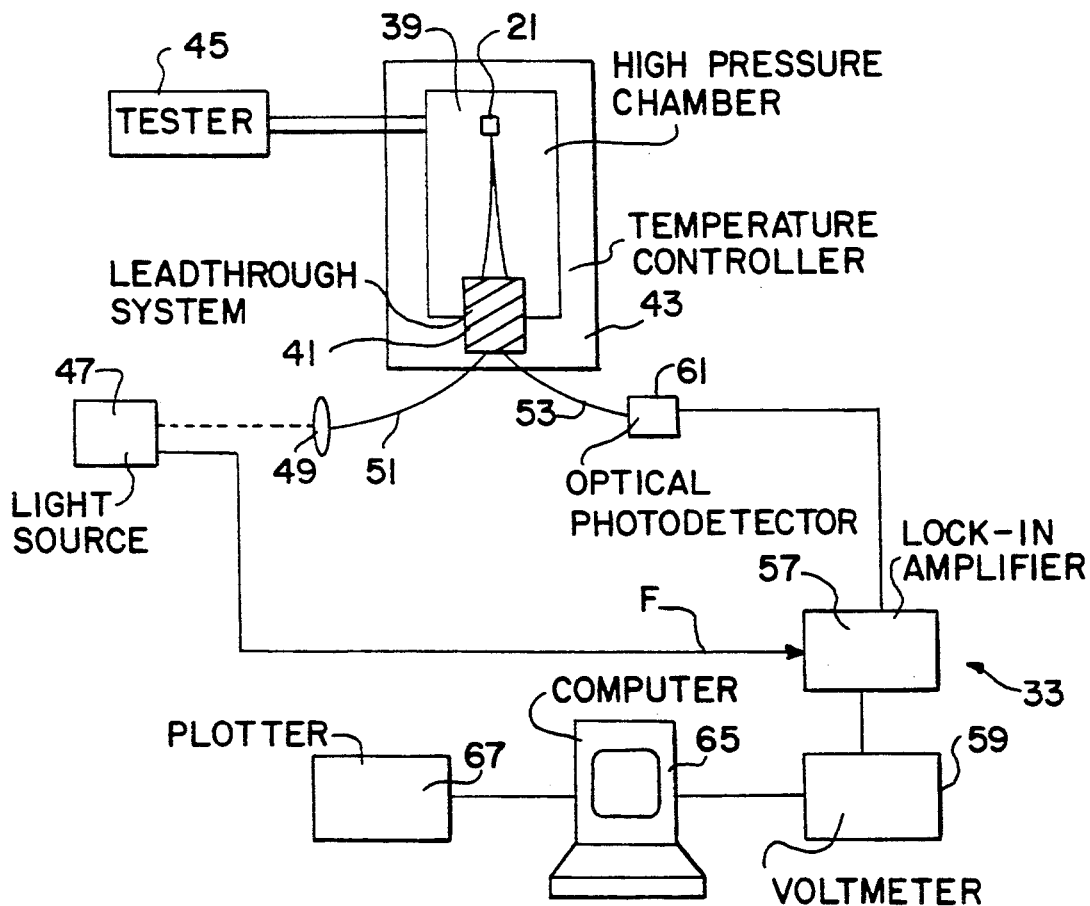
FIG. 4a shows an experimental set-up illustrating a one-sensor basic configuration used in the framework of the method.
Figure 5A:
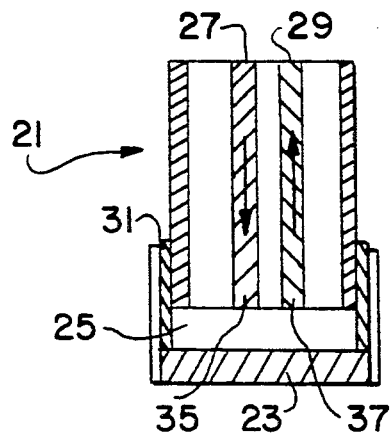
FIG. 5a is an enlargement of the sensing element(s) shown in FIGS. 4a, 4c and 4d.

FIG. 4a shows an experimental set-up illustrating a basic one-sensor configuration of the method with a sensor head (enlarged in FIG. 5a) formed by a ChLC (21) connected to an optical fiber of a leadthrough system (41). Beginning with FIG. 5a, the ChLC sample (23) is glued to a plexiglass spacer (25) and then to two multimode optical fibers (27 and 29): one source (27) and one receiving fiber (29) with a large core diameter (core 50 μm and cladding 125 μm) using two types of adhesive compounds such as UV fiber-optic resin and two-component epoxy resin (31). The fact that the UV fiber-optic resin has a refractive index compatible with the index of input/output fibers (27 and 29 assures an optimal coupling of reflected light. The two-component epoxy resin (31) is used for greater mechanical protection of the junction. The input fiber (27) carries optical energy which enters the ChLC sample (23). The output fiber (29) delivers the light that has been reflected from the ChLC layers (23 to the measuring electronics (33) shown in FIG. 4a. The thickness of the plexiglass spacer (25) between the fibers tips (35 and 37) and the ChLC (23) was subject to an elaborate optimization procedure and as a result, a 1.3 mm plexiglass spacer (25) was chosen, assuring a good insensitivity to small distance fluctuations during operation of the sensor (21).

The ChLC samples (23) are commercially available from Davis LC Inc. (Trademark), and are designed for temperature ranges from 20° C. to 45° C. Alternatively, a cholesteric film can be obtained from dispersion of a ChLC in a polyvinyl alcohol (PVA) polymer matrix and then deposited on a Dupont (Trademark) black solvent. The ChLC is a mixture of nematic host phase 2-pentyl-azoxy-benzen (nematic range from 27° C.–57° C.) with cholesteryl oleyl carbonate and cholesteryl nonanoate. All the ChLC films used were completely black, opaque and semi-rigid films with bright colors. Full color range (from blue to red) responded to about 5 degrees changes of temperature for the ChLCs of Davis LC Inc. and about 3 degrees for the prepared ChLCs.

Referring now to FIG. 4a, the sensor head assembly (21 and 41) is placed inside a standard high-pressure chamber (39) designed to sustain pressures up to 500 MPa. Insertion of the sensor (21) into the chamber (39) is accomplished using a fiber-optic leadthrough system (41) described in the U.S. Pat. No. 4,883,336 granted on Nov. 28, 1989, to BOCK et al. This leadthrough system (41) makes it possible to introduce up to 20 separate optical quartz fibers of any kind into a high-pressure chamber. The chamber (39) is thermally stabilized using an automatic temperature controller (43) with a 0.01% accuracy and a range of operation from −15° C. to 150° C. High-pressure generation and calibration is performed using a Harwood DWT-35 (trademark) dead-weight tester (45) with a reading accuracy of 0.01%, traceable to the National Institute of Standards and Technology (NIST). This device (45) can generate and calibrate pressures up to 105 HPa.

In this basic configuration, the light source (47) is a He-Ne laser (although a semiconductor laser could be used) emitting at 633 nm wavelength, modulated at frequency f using standard techniques. An objective (49) is placed between the light source (47) and the guiding optical fibers (51). A typical computer-controlled synchronous detection system (33) including a lock-in amplifier (57), a digital voltmeter (59), a computer (65) and a plotter (67) is used to recover measurement information from pressure-modulated selective reflection from the ChLC sensing element (21) collected with output optical fiber (53) and sent to the optical photodetector (61) for measurement of light intensity.

Figure 4B:
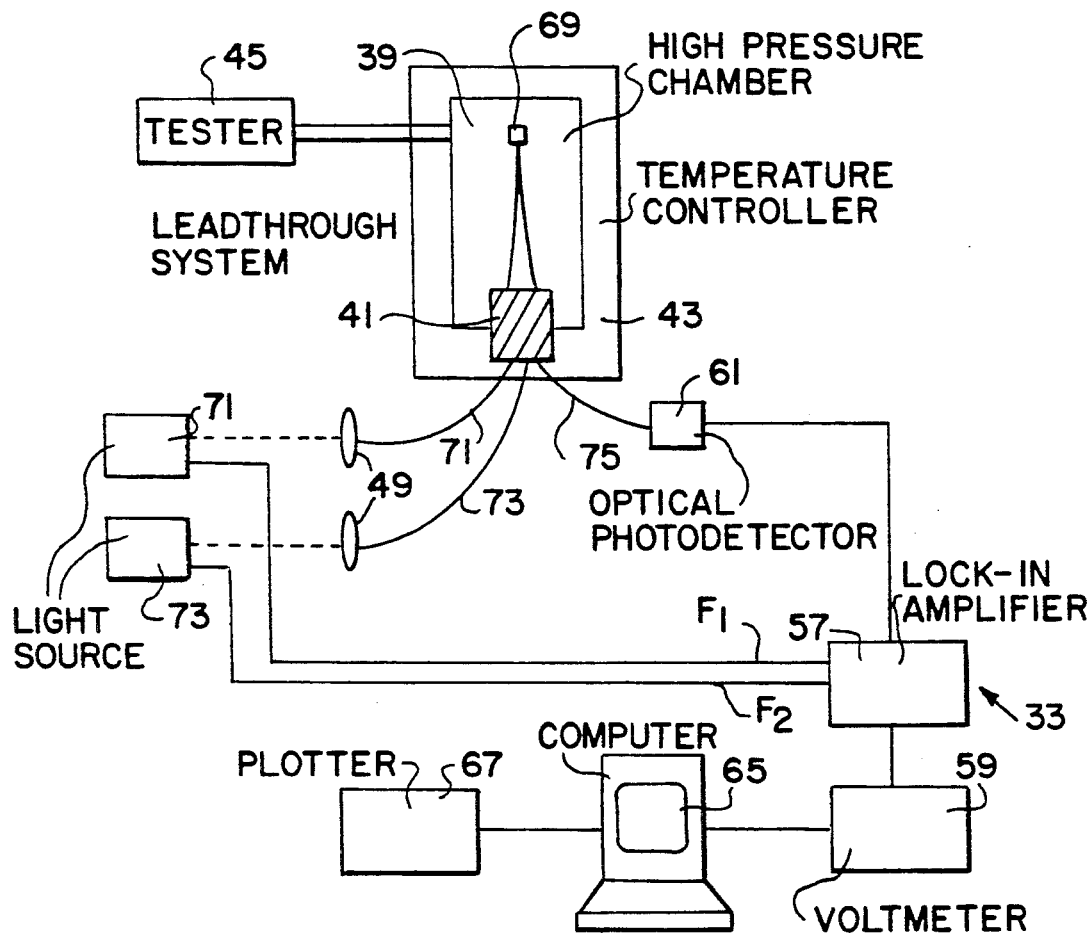
FIG. 4b shows an experimental set-up illustrating a two-source configuration used in the framework of the method.
Figure 5B:
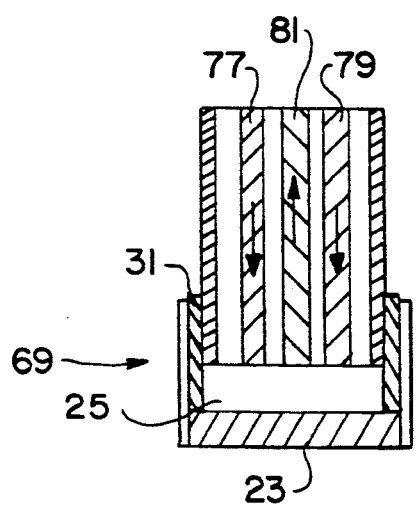
FIG. 5b is an enlargement of the sensing elements shown in FIG. 4b.

In FIG. 4b which illustrates a two-source configuration set-up of the method, the input light signals are launched from a He-Ne laser (71) emitting at 633 nm and from a semiconductor laser diode (73) emitting at 845 nm (alternatively two different semiconductor lasers can be used), both modulated at two different frequencies $f_1$ and $f_2$. The light from these sources (71 and 73) is delivered to the ChLC sensing element (69) (which is enlarged in FIG. 5b) through two separate multimode optical fibers (71 and 73) and the output collected using only one fiber (75), the remaining of the set-up being almost identical as in the basic configuration shown in FIG. 4a. As shown in FIG. 5b, the ChLC sensing element (69) is connected to two source optical fibers (77 and 79) located on both sides of a receiving optical fiber (81) collecting the reflexion of the light beams from the ChLC layer (23).

Figure 4C:
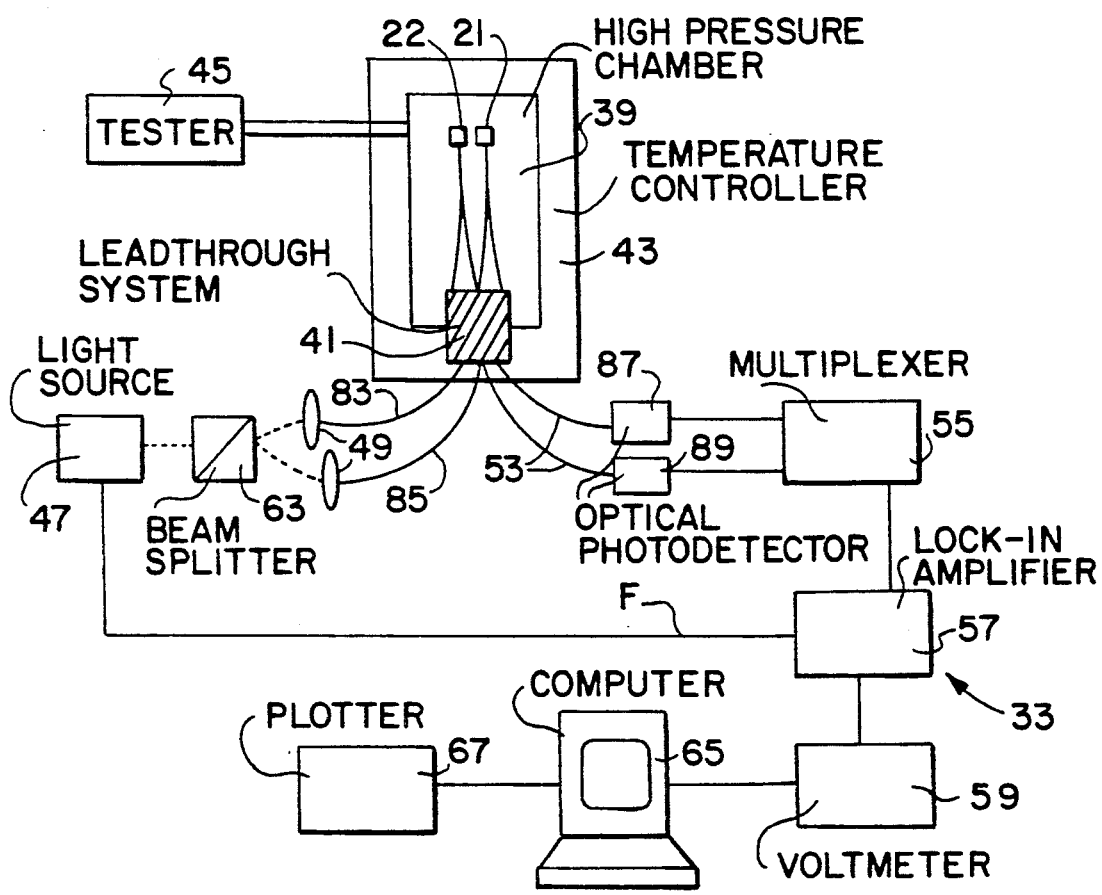
FIG. 4c shows an experimental set-up illustrating a two-sensor configuration comprising two different ChLC sensing elements having different wavelengths of selective reflection, used in the framework of the method.

In FIG. 4c which illustrates a two-sensor configuration comprising two different ChLC sensing elements (21 and 22) having different wavelengths of selective reflection, the light source (47) is a He-Ne laser emitting at 633 nm and modulated at frequency f. A beam splitter (63) is used to split the light beam launched into both sensing elements (21 and 22) by the optical fibers (83 and 85), according to the method applied. The output signals received from the ChLC sensing elements (21 and 22) by two photodetectors (87 and 89) are then fed into the lock-in amplifier (57) using a multiplexer (55).

Figure 4D:
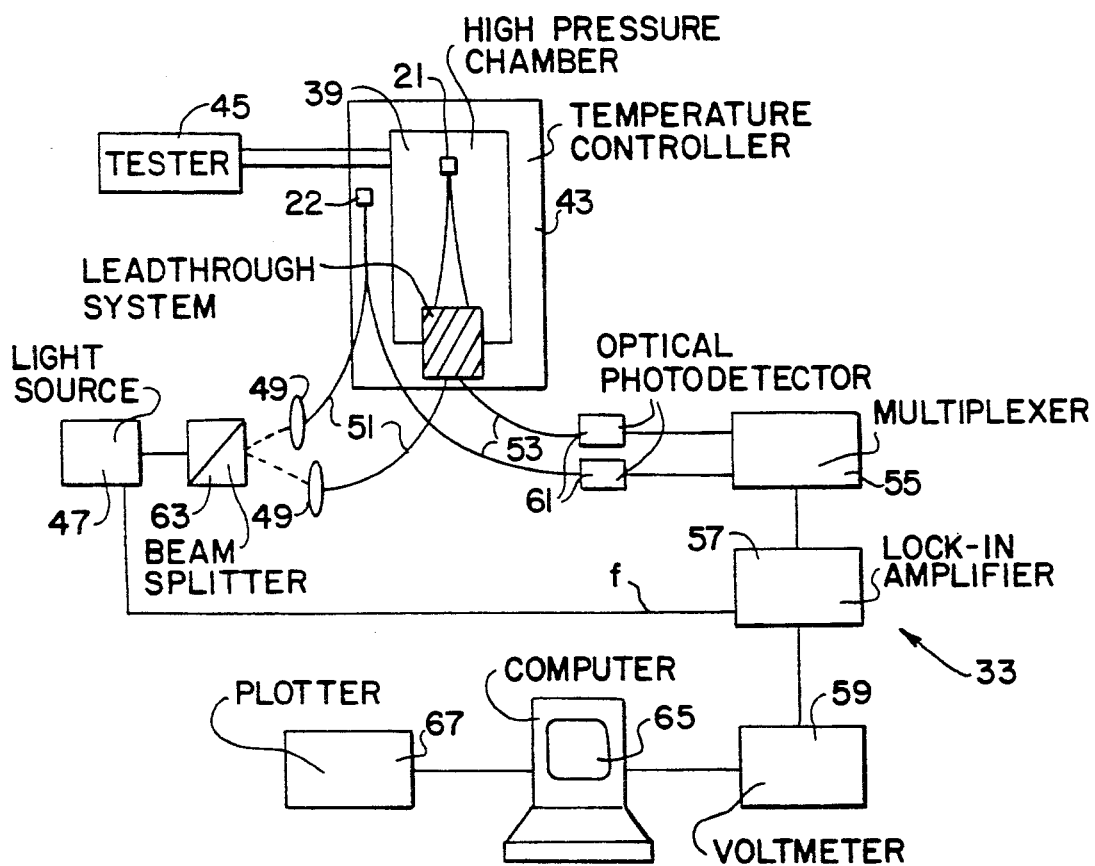
FIG. 4d shows an experimental set-up illustrating a two-sensor configuration comprising identical ChLC sensing elements kept at the same temperature conditions, used in the framework of the method.

FIG. 4d illustrates a two-sensor configuration where two identical ChLC sensing elements (21 and 22) are used with the compensating one (22) placed outside the pressure region but kept at the same temperature conditions as the sensor (21) located inside the pressure chamber (39). Excepts of this detail, the instrumentation scheme is identical as the one shown in FIG. 4c.

EXPERIMENTAL RESULTS

Figure 6:
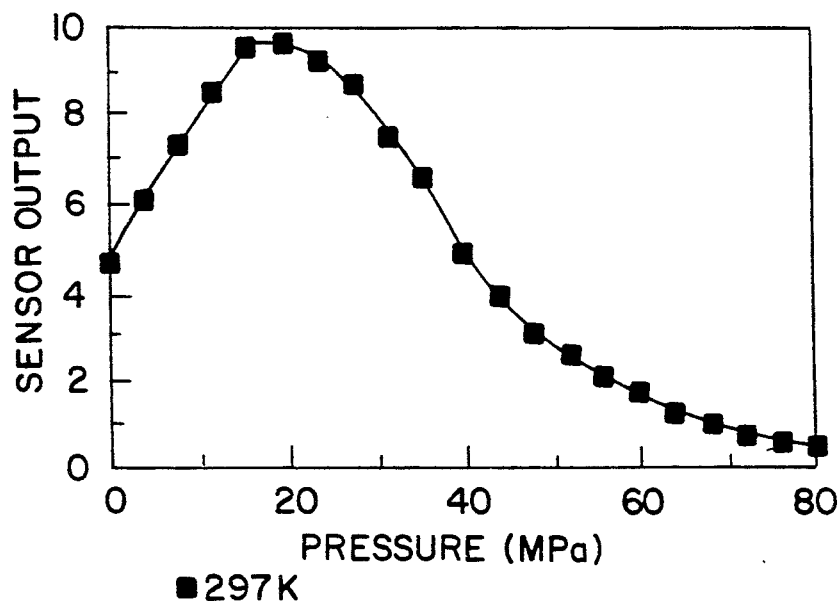
FIG. 6 is a diagram illustrating along its vertical axis a value indicative of the pressure in arbitrary units versus the pressure in MPa applied to the sensing element in the two-source configuration shown in FIG. 4b according to the method.

The sensor has been characterized for pressures up to 100 MPa and temperatures ranging from 20° C. to 30° C. in all three above-described variations of the method using references. FIG. 6 presents data on the optical energy reflected from the ChLC sensor in the two-source configuration set-up shown in FIG. 4b, for a constant temperature of 297° K.

Figure 7:
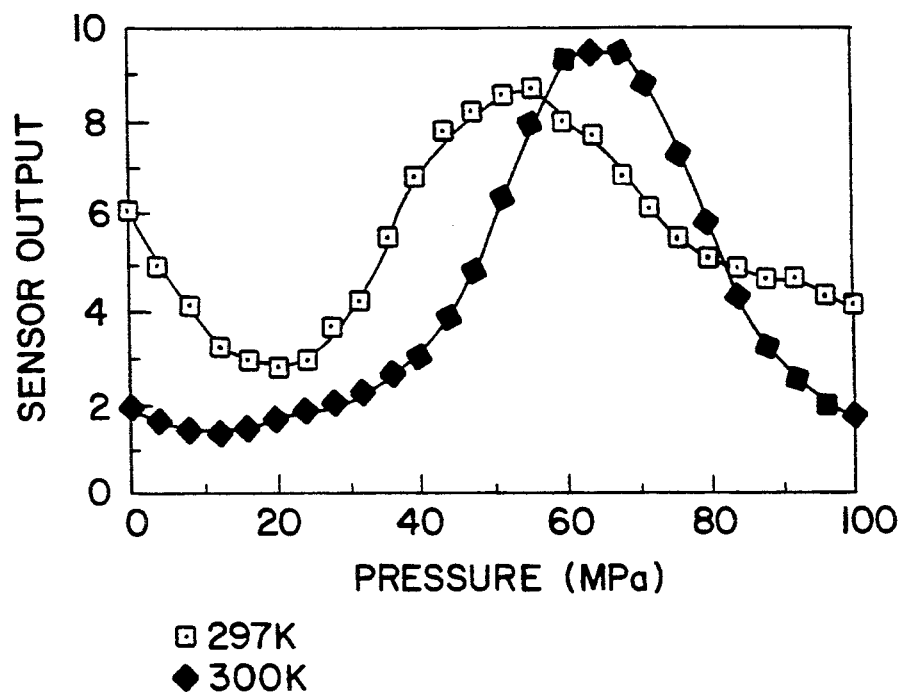
FIG. 7 is a diagram illustrating along its vertical axis a value indicative of the pressure in arbitrary units versus the pressure in MPa applied to the pair of sensing elements in the two-sensor configuration shown in FIG. 4c according to the method.

Interesting results were obtained in the two-sensor configuration set-up shown in FIG. 4c, FIG. 7 showing pressure characteristics of these sensors for two values of temperature. At lower temperatures only one sensing head is activated while the second acts as a reference. At higher temperatures, the roles of the sensing heads are interchanged (the first is a reference and the second acts as a pressure sensor).

Figure 8:
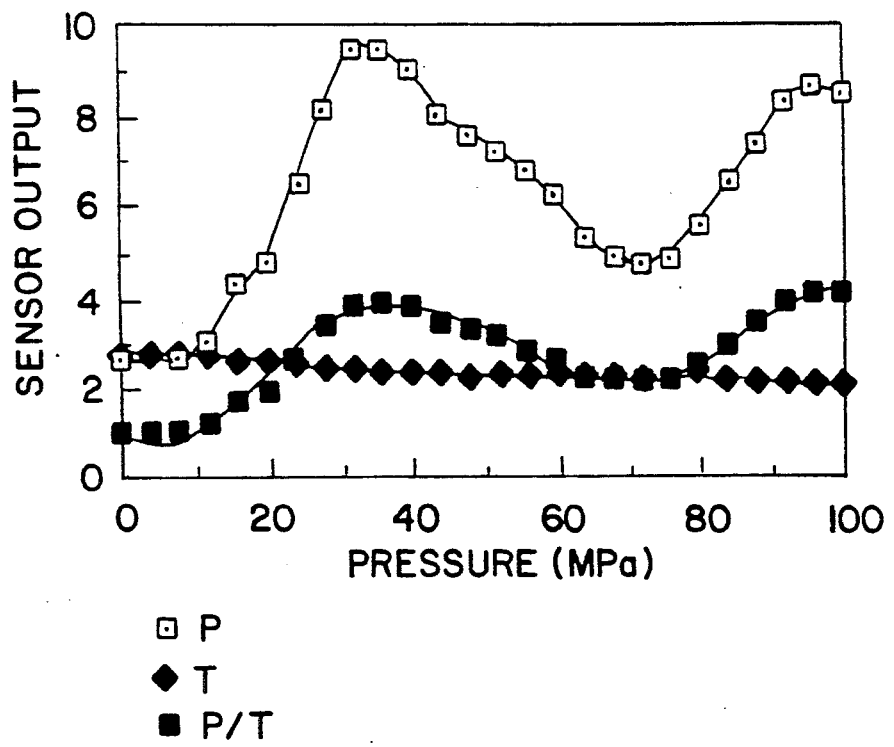
FIG. 8 is a diagram illustrating along its vertical axis a value indicative of the pressure in arbitrary units versus the pressure in MPa applied to one of the pair of sensing elements in the two-sensor configuration shown in FIG. 4d according to the method.

Some of the characteristics obtained in the two-sensor configuration set-up shown in FIG. 4d are presented in FIG. 8, one sensing element being placed in the high-pressure chamber while the other is outside the chamber, both influenced by the same temperature.

We checked our pressure runs for hysteresis and it appeared that for the ChLC samples used from Davis LC Inc., pressure-induced hysteresis was residual, generally due to the presence of adhesives, and the hysteresis diminished with increased sweeping rates.

The output signal (I) mean pressure-sensitivity expressed as:

$$a_p = \frac{1}{I} \cdot \frac{(dI)}{dp} \cdot T = \text{const} \qquad (2)$$

can be easily calculated based on the data obtained. For the cholesteric liquid crystal sample designed for the temperature range 20°–25° C., the measured sensitivity was found to be about 0.05 $MPa^{-1}$ in the linear region of pressure characteristics.

Although the present invention has been explained hereinabove by way of a preferred embodiment thereof, it should be pointed out that any modifications to this preferred embodiment, within the scope of the appended claims is not deemed to change or alter the nature and scope of the present invention.

What is claimed is:

1. Method for measurement of pressure applied to a sensing element comprising a cholesteric liquid crystal, said sensing element being connected to multimode optical fibers for communication with a light source and a device for measurement of light intensity, said method comprising the steps of:

guiding a light beam of predetermined wavelength generated by said light source toward a layer of said cholesteric liquid crystal using one of said multimode optical fibers;

collecting the light beam reflected by said layer using another of said multimode optical fibers connected to said device for measurement of light intensity;

measuring the intensity of the reflected light beam; and determining a value indicative of said pressure as a function of the measured intensity.

2. Method according to claim 1, wherein said steps of guiding, collecting and measuring are also applied to another light beam having a wavelength different from the wavelength of the first light beam, the value indicative of said pressure in said step of determining being a function of the measured intensities, whereby one of the light beams acts as a reference.

3. Method according to claim 1, wherein more than one sensing element is used, each of the sensing elements comprising cholesteric liquid crystal having, at a given temperature, reflection properties differing from one another such that said pressure can be measured for different ranges of temperature, the value indicative of said pressure in said step of determining being a function of the measured intensity.

4. Method according to claim 1, wherein said steps of guiding, collecting and measuring are also applied to another light beam having a wavelength substantially the same as the wavelength of the first light beam, using another layer of said cholesteric liquid crystal which is subjected to substantially the same temperature as the first layer but to a constant pressure, the value indicative of said pressure being a function of the measured intensities, whereby said other light beam acts as a reference.

5. Method according to claim 2, wherein the predetermined wavelengths of said first and second light beams are respectively substantially 633 nm. and 845 nm, said second light beam acting as said reference.

6. Method according to claim 3, wherein the predetermined wavelength of the light beams is substantially 633 nm.

7. Method according to claim 4, wherein the predetermined wavelength of said first and second light beams is substantially 633 nm.

* * * * *